(12) United States Patent
Friesen

(10) Patent No.: US 12,473,991 B1
(45) Date of Patent: Nov. 18, 2025

(54) APPARATUS FOR PROTECTING AN EXPOSED AIR RELEASE VALVE OR OTHER PUBLIC WORKS COMPONENT

(71) Applicant: GENEVA PIPE AND PRECAST COMPANY, Vancouver, WA (US)

(72) Inventor: Jed Christopher Friesen, Burnaby (CA)

( * ) Notice: Subject to any disclaimer, the term of this patent is extended or adjusted under 35 U.S.C. 154(b) by 0 days.

(21) Appl. No.: 18/194,140

(22) Filed: Mar. 31, 2023

(51) Int. Cl.
*F16K 27/12* (2006.01)
*B65D 88/76* (2006.01)

(52) U.S. Cl.
CPC .............. *F16K 27/12* (2013.01); *B65D 88/76* (2013.01); *Y10T 137/7021* (2015.04)

(58) Field of Classification Search
CPC ...... B65D 88/76; B65D 90/105; B65D 11/10; B65D 43/02; B65D 51/16; B65D 51/1605; B65D 51/1611; B65D 43/08; E03B 7/095; E03B 9/10; E03F 5/08; F16K 27/12; Y10T 137/6851; Y10T 137/6966; Y10T 137/6969; Y10T 137/6988; Y10T 137/6991–7028; Y10T 137/7043–7065
USPC .... 137/363, 364, 366, 371, 377–382.5, 373; 220/484
See application file for complete search history.

(56) References Cited

U.S. PATENT DOCUMENTS

| | | | | |
|---|---|---|---|---|
| 173,822 A * | 2/1876 | Smith | ...................... | F16L 55/00 137/365 |
| 1,253,930 A * | 1/1918 | Briel | ...................... | F16K 27/12 137/861 |
| 2,724,968 A * | 11/1955 | Greene | .................... | G01F 15/14 73/201 |
| 2,869,576 A * | 1/1959 | Kennedy | .................... | E03B 9/02 251/112 |
| 3,297,050 A * | 1/1967 | Rider | .................. | F16K 37/0008 251/327 |
| 3,867,958 A * | 2/1975 | Turnwald | ................ | F16K 49/00 251/359 |
| 3,921,449 A * | 11/1975 | Hauffe | .................... | G01F 15/14 49/35 |
| 4,005,253 A * | 1/1977 | Walter | .................... | H01F 27/06 70/229 |

(Continued)

FOREIGN PATENT DOCUMENTS

| AT | 16125 U1 | 2/2019 |
|---|---|---|
| KR | 100768157 B1 | 10/2007 |

*Primary Examiner* — Kenneth Rinehart
*Assistant Examiner* — Jonathan J Waddy
(74) *Attorney, Agent, or Firm* — Egbert, McDaniel & Swartz, PLLC

(57) ABSTRACT

An apparatus for protecting an exposed air release valve or other public works component includes an enclosure with a side wall and an open end, wherein a flange extends along a perimeter of the open end. The flange has a plurality bolt holes formed therethrough. A base, which is positionable over the exposed air release valve, has an open top, an open bottom and a horizontal bearing surface extending along a perimeter of the side wall adjacent the open top. The horizontal bearing surface is adapted to receive the flange of the enclosure. The base has a plurality of bolt holes formed thereon corresponding to locations of the plurality bolt holes of the enclosure. The enclosure may be provided in vented or un-vented configuration. A method of covering an exposed air release valve is also disclosed.

16 Claims, 7 Drawing Sheets

(56) References Cited

U.S. PATENT DOCUMENTS

| | | | | |
|---|---|---|---|---|
| 4,340,081 A * | 7/1982 | Watson | ............... | A01G 25/162 |
| | | | | 137/364 |
| 4,925,045 A * | 5/1990 | Logsdon | ............... | E04G 15/061 |
| | | | | 220/4.24 |
| 4,989,634 A * | 2/1991 | Rieseck | ............... | B67D 7/3209 |
| | | | | 137/234.6 |
| 4,993,450 A * | 2/1991 | Dunn | ............... | F16L 59/161 |
| | | | | 137/381 |
| 5,253,384 A * | 10/1993 | Joines | ............... | A47L 11/4058 |
| | | | | 15/49.1 |
| 5,375,741 A * | 12/1994 | Harris | ............... | B65D 77/061 |
| | | | | 222/105 |
| 5,392,940 A * | 2/1995 | Pierce | ............... | B65F 1/1623 |
| | | | | 220/669 |
| 5,957,157 A * | 9/1999 | Mitchell | ............... | F16K 17/196 |
| | | | | 137/526 |
| 6,247,490 B1 * | 6/2001 | Mosher | ............... | E03B 5/00 |
| | | | | 137/372 |
| 6,260,582 B1 * | 7/2001 | Trautmann | ............... | B60T 17/02 |
| | | | | 137/884 |
| 6,362,419 B1 * | 3/2002 | Gallagher | ............... | H02B 1/50 |
| | | | | 174/37 |
| 6,474,358 B1 * | 11/2002 | Malkvist | ............... | F16K 27/12 |
| | | | | 137/364 |
| 6,518,499 B1 * | 2/2003 | Kessler | ............... | F16M 5/00 |
| | | | | 174/37 |
| 6,536,462 B1 * | 3/2003 | Laugen | ............... | E03B 9/06 |
| | | | | 137/364 |
| 7,318,446 B1 * | 1/2008 | Tarver | ............... | F16K 27/12 |
| | | | | 137/372 |
| 8,117,686 B2 | 2/2012 | Powell et al. | | |
| 8,464,689 B2 * | 6/2013 | Born | ............... | F02M 35/10144 |
| | | | | 251/305 |
| 10,760,238 B2 | 9/2020 | Herdman et al. | | |
| 2004/0237180 A1 | 12/2004 | Evans, Jr. et al. | | |
| 2006/0260694 A1 * | 11/2006 | Brill | ............... | F16K 17/04 |
| | | | | 137/556 |
| 2007/0272305 A1 * | 11/2007 | Schumacher | ............... | F16K 27/12 |
| | | | | 137/382 |
| 2009/0289068 A1 * | 11/2009 | Baker | ............... | B65D 88/76 |
| | | | | 220/484 |
| 2011/0108136 A1 * | 5/2011 | Margalit | ............... | G01F 15/14 |
| | | | | 137/343 |
| 2012/0255628 A1 * | 10/2012 | Pourzynal | ............... | E03B 7/095 |
| | | | | 29/897.3 |
| 2013/0185856 A1 | 7/2013 | Powell et al. | | |
| 2013/0336723 A1 * | 12/2013 | McKinney | ............... | E03F 5/02 |
| | | | | 405/129.55 |
| 2016/0115668 A1 | 4/2016 | Halbirt et al. | | |
| 2018/0305917 A1 * | 10/2018 | LaVancher | ............... | B01D 53/14 |
| 2019/0009980 A1 * | 1/2019 | McDuffe | ............... | E02D 31/00 |

* cited by examiner

APPARATUS FOR PROTECTING AN EXPOSED AIR RELEASE VALVE OR OTHER PUBLIC WORKS COMPONENT

CROSS-REFERENCE TO RELATED APPLICATIONS

Not applicable.

BACKGROUND OF THE INVENTION

1. Field of the Invention

The present invention relates to the field of sanitary sewer systems. More particularly, the present invention relates to covers for exposed air release valves of sanitary sewer systems, and other exposed public works components.

2. Description of Related Art Including Information Disclosed Under 37 CFR 1.97 and 37 CFR 1.98

Air release valves (ARV's) are utilized in sanitary sewer and other public works fields, and are provided to a release air pockets and gas buildups in sanitary sewer lines. ARV's can also be used in other public works projects such as potable and recycled water pipelines. Typically, ARV's are provided on a pipeline riser connected to the water or sanitary sewer pipeline. The pipeline riser extends upwardly from the pipeline, has a shut off valve and a drain valve, and is topped with an air release valve. These ARV's are provided at the high-points of the pipeline so as to facilitate release of air. ARV's may also be provided along a force main of the sanitary sewer or water pipeline system.

In certain situations, ARV's are provided below grade, in which case they may positioned within a manhole or like below-grade structure, and thus are not subject to being struck by a landscaping equipment or vehicles. However, in many cases, depending upon the specifics of the project, the ARV may be provided at or above grade, and as such, extend above the ground surface so as to be exposed. For example, ARV's are often provided above grade in geographical areas with little elevation gain above sea level, and some other areas where providing the ARV's below grade is impractical due to ground or ground water conditions.

In areas where ARV's are provided at or above grade, they can be subject to damage and vandalism. Most commonly, ARV's are subject to being struck by a landscaping equipment and vehicles, as they are often positioned in medians or a right-of-way which are maintained by landscaping crews, and may be driven over by vehicles. As such, enclosures are typically provided over the ARV's for protection purposes. The prior art enclosures are provided without an anchored base which could be provided in concrete or other suitable materials, and are set over the ARV or other public works component. These enclosures are often produced out of light weight materials that are not anchored in the ground, and can become dislodged by landscaping equipment or vehicles, or become intentionally dislodged, resulting in the exposure of the ARV and subjecting the ARV to potential damage or acts of vandalism. The air that is released in an ARV when activated can emit gases that are corrosive to the enclosure. These gases weaken the enclosure and increase the chances of the enclosure becoming brittle, cracking, breaking or being altered in such a way that the enclosure becomes dislodged.

Consequences of a damaged ARV are a significant health risk fro the public at large as well as for the sanitary sewer district operator. For example, in the case of a sanitary sewer line, a leak caused by damage to the ARV is extremely problematic. Each instance of a leak (known as a sanitary sewer overflow) must not only be reported to the Environmental Protection Agency but also releases untreated sewage into public water ways. The EPA can level significant fines to the operators or owners of the sanitary sewer system, and a leak is both time-consuming and costly to repair. A leak in a water line having an ARV is similarly problematic, particularly if there is potential exposure of the potable water to contaminants entering the potable water distribution system, which would result in significant repairs and remediation measures, such as boil water notices.

As such, a need has surfaced for an ARV enclosure which can adequately protect the ARV from damage and the consequences of the sanitary sewer overflow leak.

It is an object of the present invention to provide an ARV enclosure that is sturdy and resistant to damage caused by landscaping equipment and vehicles.

It is another object of the present invention to provide an ARV enclosure that prevents sanitary sewer overflow or other leaks.

It is another object of the present invention to provide an enclosure for an ARV or other public works component which saves time and money associated with leaks of the pipeline.

It is yet another object of the present invention to provide an ARV enclosure which is resistant to corrosion induced by a raw sewage leak.

It is another object of the present invention to provide an ARV enclosure which is properly vented for releasing gas or air that is built up in the pipeline.

It is yet another object of the present invention to provide an ARV enclosure which resists defacement and vandalism.

It is yet another object of the present invention to provide an ARV enclosure which has a precast or cast-in-place concrete base.

It is another object of the present invention to provide an ARV enclosure which can be installed quickly, securely and easily.

These and other objects and advantages of the present invention will become apparent from a reading of the attached specification and appended claims.

BRIEF SUMMARY OF THE INVENTION

The present invention is an apparatus for protecting an exposed air release valve or other public works component. The apparatus includes a cover having a side wall and an open end with a flange extending along a perimeter of the open end. The flange has a plurality of bolt holes formed therethrough. The apparatus includes a base having a side wall, an open top, an open bottom, and a horizontal bearing surface extending along a perimeter of the side wall adjacent the open top. The horizontal bearing surface is adapted to receive the flange of the cover. The base is a plurality of bolt holes formed thereon corresponding to locations of the plurality of bolt holes of the cover. In an embodiment, the plurality of bolt holes of the cover and the plurality of bolt holes of the base include threaded inserts suitable for receipt of threaded bolts.

In an embodiment, the side wall of the base includes an outwardly protruding perimeter adjacent the open bottom thereof.

In an embodiment, the enclosure includes at least one integrally-formed vent. The integrally-formed vent can be a panel extending at an acute angle relative to the side wall of the enclosure. The vent can also be a slot formed in the side wall.

In an embodiment, the side wall of the base includes four side walls in a square configuration. The enclosure may include four side walls angled inwardly towards each other extending upwardly from the base, and a flat top.

In an embodiment the enclosure and/or base has a UV-resistant gel coat exterior that may be colored or labeled with markings required by the utility district.

In an embodiment, the enclosure and the base are constructed of fiber-reinforced plastic material that is highly corrosion resistant to gases commonly found in raw sewage.

In an embodiment, the flange includes a transition section extending in a generally horizontal direction from the side wall of the enclosure, wherein vertical walls extend outwardly from the transition section in a generally vertical direction.

In an embodiment, the horizontal bearing surface of the base is positioned inwardly from the side wall of the base so as to form a seat on the perimeter of the side wall of the base. The seat is positionable against the vertical walls of the flange of the enclosure.

The present invention is also an apparatus for protecting an exposed air release valve or other public works component from damage. The apparatus includes an enclosure having four side walls, a square-shaped open end and a flat top opposite the square-shaped open end. The four side walls extend angularly inwardly towards each other and upwardly from the square-shaped open end. The enclosure has a flange extending along a perimeter of the square-shaped open end. The flange has a plurality of bolt holes formed therethrough. The enclosure has at least one integrally-formed vent. A square-shaped base is provided having four side walls, an open top, an open bottom, and a horizontal bearing surface extending along a perimeter of the four side walls adjacent the open top. The horizontal bearing surface is adapted to receive the flange of the enclosure. The base is a plurality of bolt holes formed thereon corresponding to locations of the plurality of bolt holes of the enclosure.

In an embodiment, the vent includes a panel extending at an acute angle relative to a side wall of the four side walls of the enclosure.

In an embodiment, the vent is a slot formed in the side wall.

In an embodiment the enclosure and/or base has a UV-resistant gel coat exterior that may be colored or labeled with markings required by the utility district.

In an embodiment, the enclosure and the base are constructed of fiber-reinforced plastic material that is highly corrosion resistant to gases commonly found in raw sewage.

In an embodiment, the flange includes a transition section extending in a generally horizontal direction from the side wall of the enclosure, wherein vertical walls extend outwardly from the transition section in a generally vertical direction.

The present invention is also a method of protecting an exposed air release valve the method includes the steps of: excavating an area around the exposed air release valve; placing a base in the excavated area, the base having an open top and an open bottom, wherein an outwardly-protruding portion is formed around the perimeter of the base adjacent the open bottom, wherein the area is excavated beyond the outwardly-protruding portion of the base; pouring concrete around the base and over the horizontal bearing surface of the base; placing an enclosure on top of the open end of the base, wherein the enclosure has a flange at an open bottom end thereof, the flange adapted to receive the open top of the square-shaped base; and affixing the enclosure to the base by inserting bolts into bolt holes formed through the base and enclosure, the bolt holes having threaded inserts therein.

In an embodiment, the step of pouring concrete includes pouring concrete off-site so as to form a prefabricated weight around the base.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
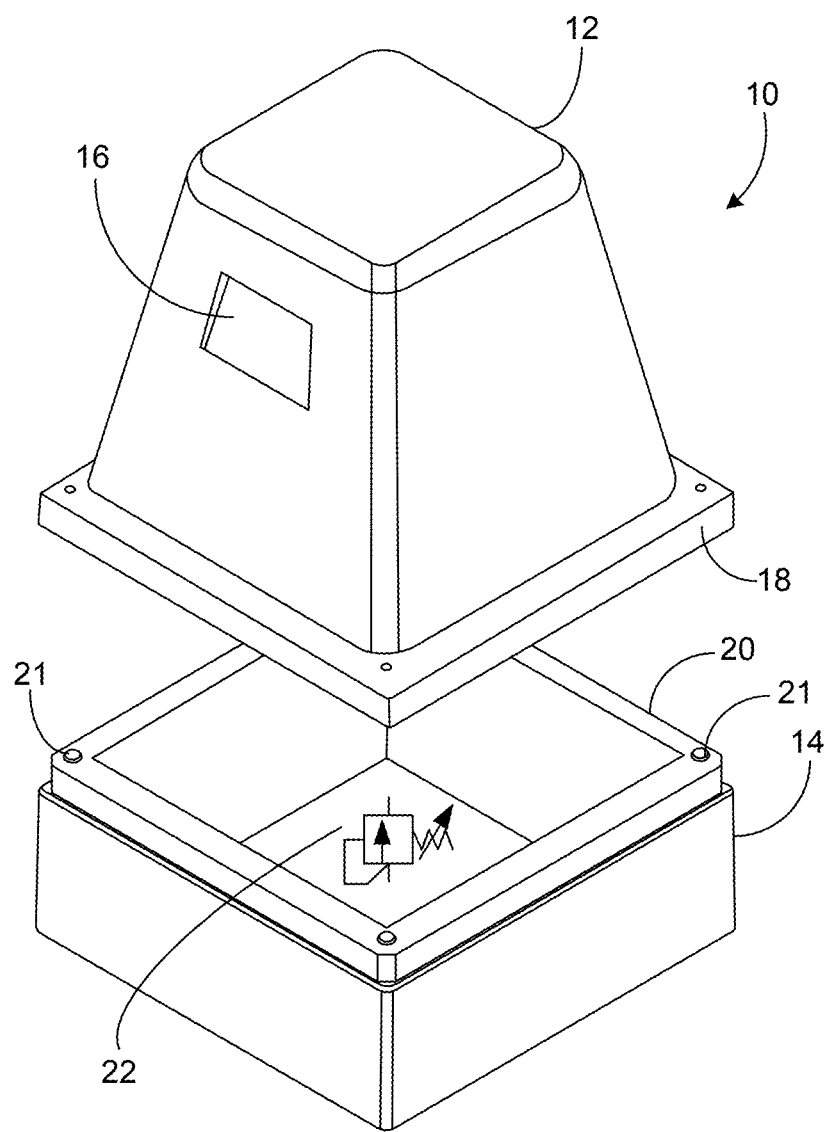
FIG. 1 is a perspective view of the ARV capsule of the present invention, wherein the enclosure is being placed over the base.

Referring to FIG. 1, there is shown a perspective view of the ARV capsule 10 of the preferred embodiment of the present invention. The ARV capsule 10 has an enclosure 12. The enclosure 12 preferably has a UV-resistant gel coat exterior. The enclosure 12 is UV and corrosion-resistant and is capable of being supplied in a wide range of covers and with markings per utility agency requirements. The enclosure 12 is positioned over a base 14, which also has a UV-resistant gel coat exterior.

In FIG. 1, it can be seen how the enclosure 12 has a square-shaped open end with a flange 18 extending therearound. A plurality of side walls extend upwardly from the flange 18.

The base shown in FIG. 1 is square-shaped having four side walls with an open top end and open bottom. A horizontal bearing surface 20 is shown at the open top of the base 14.

In the interior of the base 14, there is shown an air release valve 22 extending outwardly from the ground surface therebelow.

As can be seen in FIG. 1, the enclosure 12 is positionable over the base 14 so as to protect the air release valve 22. It can be seen that threaded inserts 21 are received in the enclosure 21 and the base 14 so as to receive bolts therein (to be described hereinafter).

Figure 2:
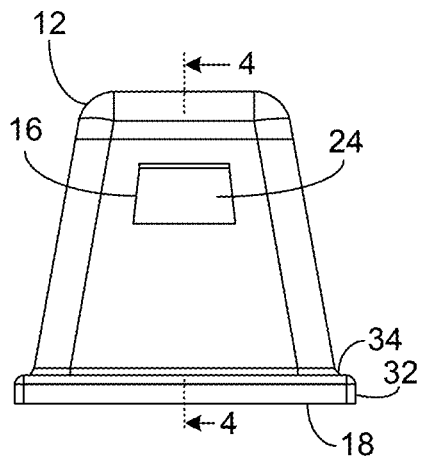
FIG. 2 is a perspective view of the enclosure of the ARV capsule the present invention.

Referring to FIG. 2, there is shown a perspective view of the enclosure 12 of the ARV capsule 10 of the present invention. In FIG. 2, it can be seen how the enclosure 12 has at least one vent 16 formed in a side wall 30 thereof. FIG. 1 illustrates one embodiment of the present invention wherein the vent 16 includes a panel 24 extending at an acute angle relative to the side wall 30. An opening 26 is formed in the vent so as to release air or other gases built up with the release by the air release valve 22.

FIG. 2 also illustrates how the enclosure 12 includes a plurality of side walls 30 which extend angularly upwardly from the flange 18 of the enclosure. The plurality of side walls 30 extend inwardly towards each other and meet at a flat top 28.

FIG. 2 additionally illustrates how the flange 18 of the enclosure has a plurality of bolt holes 36 formed on the flange 18 thereof. FIG. 2 illustrates bolt holes 36 formed at the corners of the square-shaped flange 18. Preferably, these bolt holes 36 have threaded inserts 21 therein (as shown in FIG. 1) for receipt of bolts, such as hex head bolts, cap head bolts, penta head security bolts, eye bolts or others as required. As explained below, these bolts are used to connect the enclosure 12 with the base 14.

FIG. 2 also illustrates the particulars of the flange 18. Specifically, the flange 18 comprises a transition section 34 which extends in a generally-horizontal direction from the substantially vertical side walls 30. The transition section 34 of the flange 18 is connected to vertical walls 32 of the flange 18 which extend downwardly therefrom.

Figure 3:
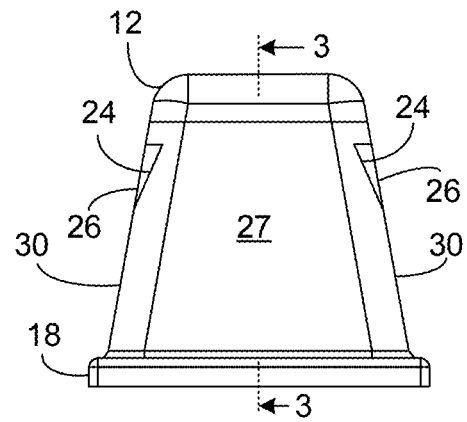
FIG. 3 is a side view of the enclosure of the ARV capsule of the present invention.

FIG. 3 is utilized to illustrate, in particular, the configuration of the transition section 34 and vertical walls 32 of the flange 18.

Figure 4:
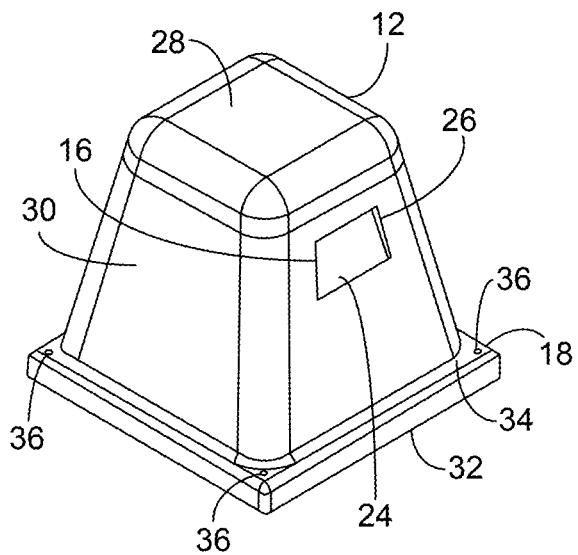
FIG. 4 is a partially cross-sectional view of the enclosure of the ARV capsule of the present invention.

Referring to FIG. 4, there is shown a front view, partially cross-sectional, taken along line 4 of FIG. 3. In particular, FIG. 4 illustrates the vent 16 of the preferred embodiment of the present invention. As can be seen, the vent 16 includes the panel 24, extending at an acute angle relative to the adjacent side wall 30. The opening 26 formed as a result of the angled panel 24 is also clearly visible in FIG. 4. Different embodiments of the present invention can include different types of vents. The enclosure can also be provided in a non-vented configuration, depending upon the particulars of the project. FIG. 4 also illustrates how the enclosure 12 has a hollow interior 27, such that the enclosure is in a generally inverted rectangular shape with sloping downward walls.

Figure 5:
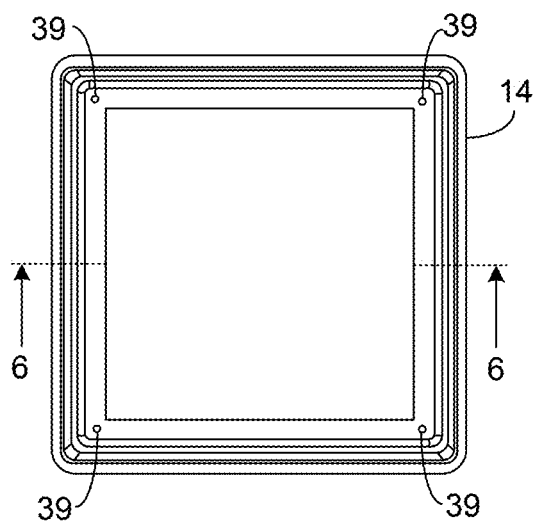
FIG. 5 is a top view of the base of the ARV capsule the present invention.

Referring to FIG. 5, there is shown a top view of the base 14 of the ARV capsule 10 of the present invention. FIG. 5 illustrates how the bolt holes 39 are formed at the corners of the square-shaped base 14. These bolt holes 39 also preferably have threaded inserts therein for receipt of the eye bolts. The bolt holes 39 are formed on the base 14 in locations corresponding with the bolt holes 36 of the enclosure 12. As such, when the enclosure 12 is placed over the base 14, bolts can be utilized to secure the enclosure 12 to the base through the bolt holes 36 and 39.

Figure 6:
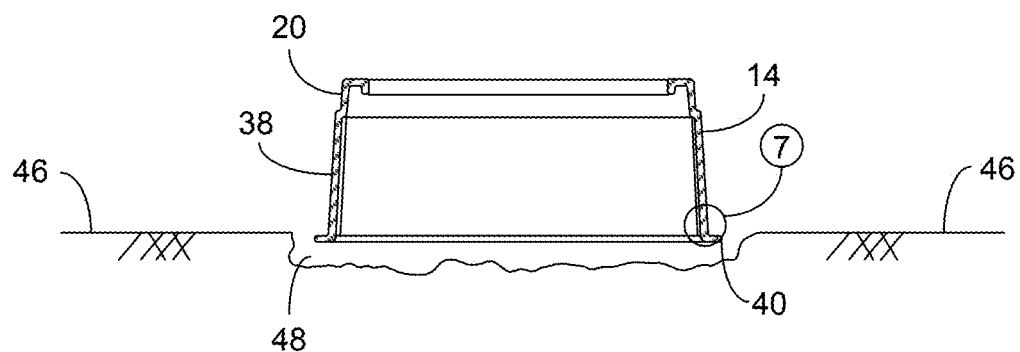
FIG. 6 is a side view, partially cross-sectional, of the base of the ARV capsule being placed in the excavated area.

FIG. 6 illustrates the base 14 being installed over an air release valve (not shown). In particular, in FIG. 6 it can be seen how an excavation 48 is made below the ground surface 46. The ARV (not shown) would be in the center of the excavation 48. The excavation 48 is over-excavated around the outwardly protruding perimeter piece 40 of the base 14. The area is excavated beyond this piece 40.

Figure 7:
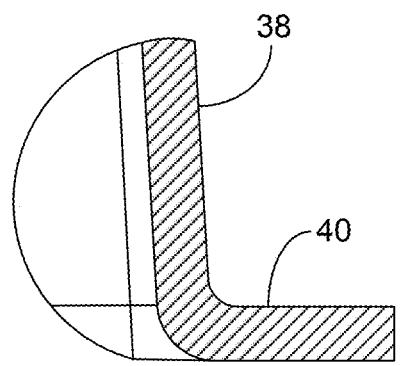
FIG. 7 is a close-up, cross-sectional view of the outwardly-protruding portion of the base of the ARV capsule of the present invention.

FIG. 7 illustrates a cross-sectional, close-up view of this outwardly-protruding perimeter piece 40. As can be seen in FIG. 7, this piece 40 extends outwardly from the side walls 38 of the base 14. FIGS. 5-7 show the side walls 38 of the base as extending in a nearly vertical section relative to the ground surface 46, but are angled slightly inwardly, as is most clearly visible in FIGS. 6 and 14 (wherein an angle of 3 degrees from a vertical line is illustrated).

Figure 8:
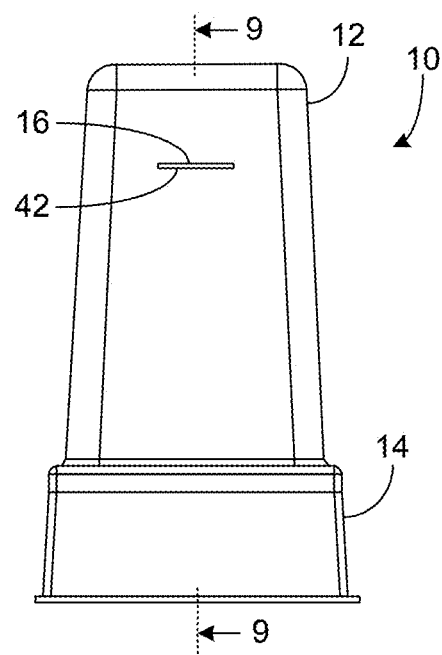
FIG. 8 is a side view of the present invention of the ARV capsule top and base.

FIG. 8 illustrates a side view of the ARV capsule 10. In FIG. 8, it can be seen how the enclosure 12 is compared to the enclosure 12 shown in previous figures. As can be appreciated, different sizes, shapes and colors of the enclosure 12 can be provided depending on the application, including enclosures and bases having shapes other than rectangular shapes.

FIG. 8 illustrates an embodiment of the present invention wherein the vent 16 is in the form of a slot 42. One or more of the slots 42 can be formed on side walls of the enclosure 12.

Figure 9:
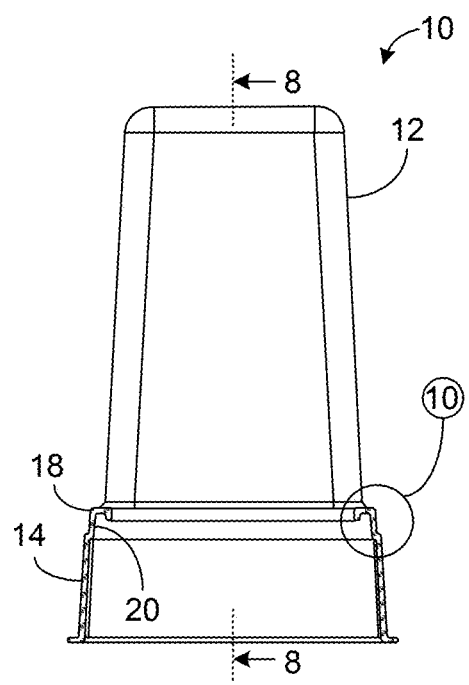
FIG. 9 is a front view f the present invention of the ARV capsule top and base.

FIG. 9 is a front view, partially cross-sectional, illustrating the enclosure 12 being positioned over the base 14. As can be seen in FIG. 9, the enclosure 12 fits securely over the base 14 due to the flange 18 of the enclosure 12 in the corresponding horizontal bearing surface 20 of the base 14.

Figure 10:
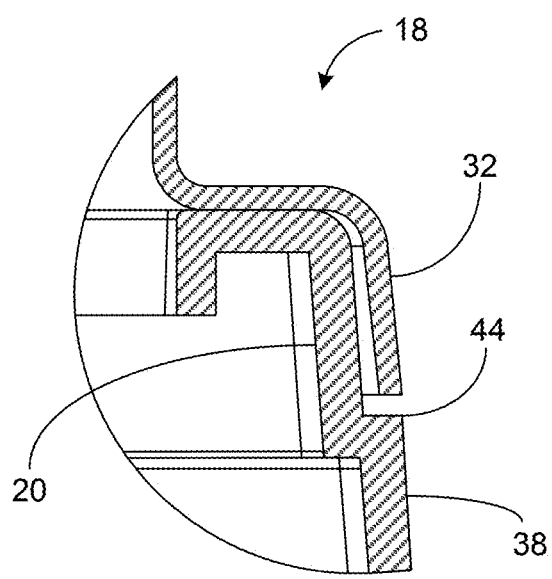
FIG. 10 is a close-up view, cross-sectional, of the connection between the enclosure and the base of the ARV capsule the present invention.

FIG. 10 is an isolated, close-up view showing this connection between the enclosure 12 and the base 14. As can be seen in FIG. 10, the flange 18 of the enclosure 12 fits securely against the horizontal bearing surface 20 of the base 14. In particular, it can be seen how vertical walls 32 of the flange 18 extend over the horizontal bearing surface 20 and rest on a seat 44 formed by the horizontal bearing surface 20 of the base 14. This seat 44 is formed at an upper end of a side wall 38 of the base by providing the horizontal bearing surface 20 slightly inward of the vertical wall 38 of the base 14. This secure connection prevents intrusion of water into the interior of the ARV capsule 10 and also provides connection between the two components.

Figure 11:
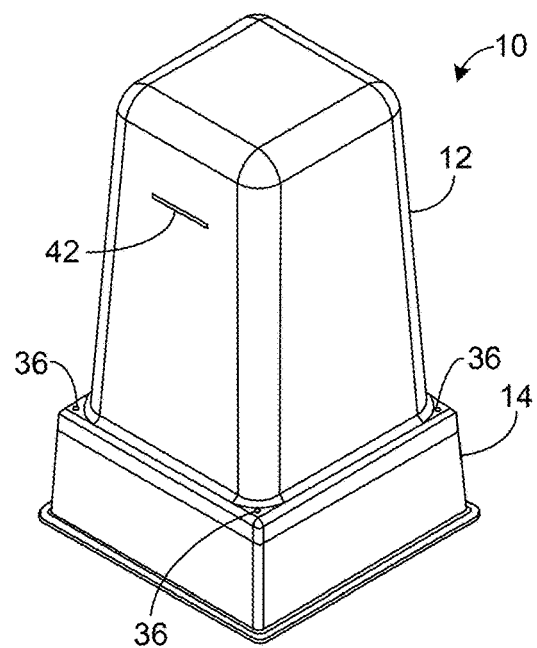
FIG. 11 is a perspective view of the ARV capsule of the present invention, wherein the enclosure is elongated version.

FIG. 11 illustrates a perspective view of the ARV capsule 10. As can be seen in FIG. 11, the bolt holes 36 of the enclosure 12 are positioned on the corners of the enclosure 12 so as be align with the bolt holes 39 of the base 14 (not shown).

In the method of the present invention, referring to FIG. 6, an area around the exposed air release valve is excavated. The base is placed in the excavated area, wherein the base has an open top and open bottom. A horizontal bearing surface extends outwardly from the bottom of the base 14, and the area excavated is over excavated beyond this horizontal bearing surface. Concrete is then poured around the base in the excavated area and is poured over the outwardly extending piece 40 so as to secure the base in the excavated area. The enclosure is then placed over the base. The flange of the enclosure is adapted to receive the open end of the square-shaped base. The enclosure is then affixed to the base by inserting bolts into the bolt holes formed through the base and the enclosure. The bolts can be hex head bolts, cap head bolts, penta head security bolts, eye bolts or others as required. Preferably, the bolt holes of the base and the enclosure have threaded inserts therein.

The ARV capsule 10 of the present invention may also be precast. In this embodiment, the step of pouring concrete occurs off-site. Specifically, a concrete weight is formed around the base of the ARV enclosure and then the prefabricated base is shipped with concrete such that it can easily be placed in an excavated area without having to pour concrete on-site.

Figure 12:
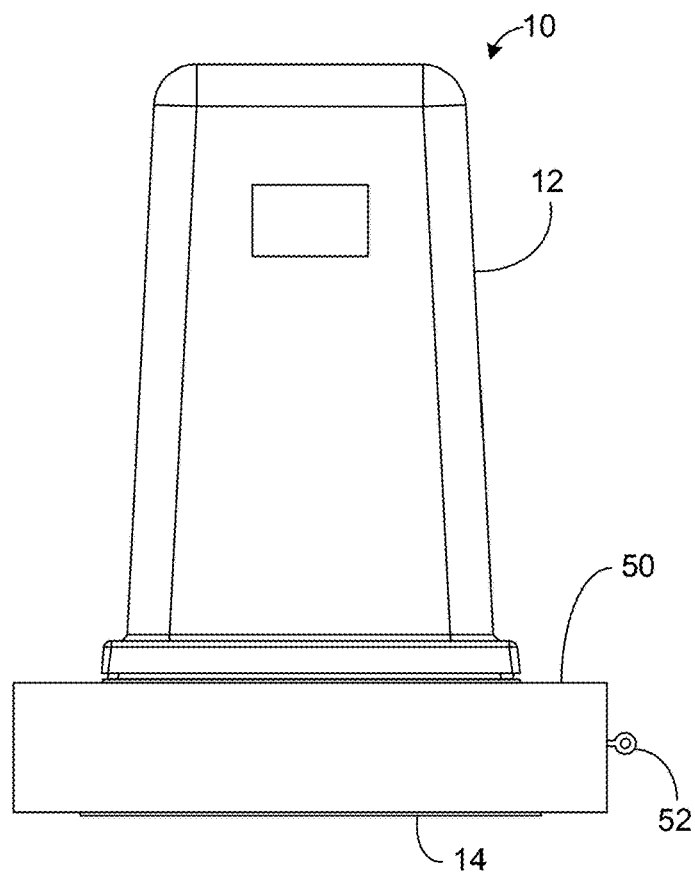
FIG. 12 is a side elevation view of the precast version of the present invention, wherein a concrete block is formed around the base.
Figure 13:
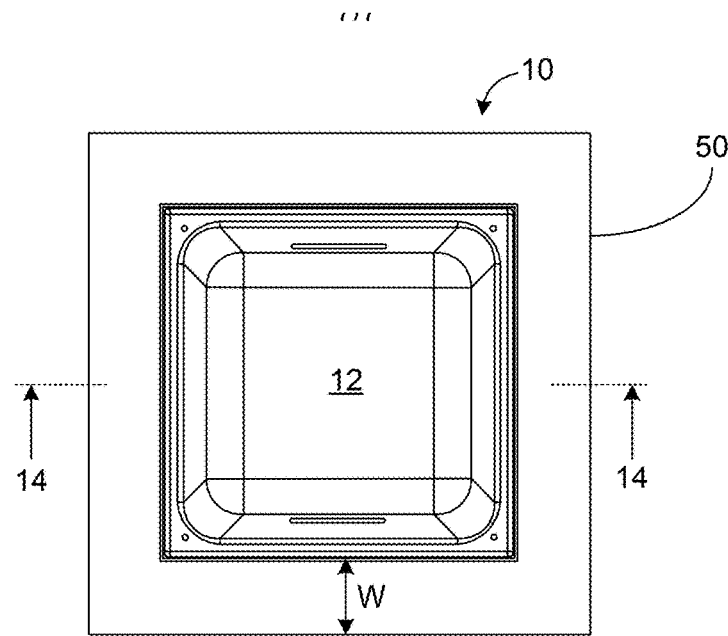
FIG. 13 is a top view of the precast version of the present invention.

FIGS. 12 and 13 illustrate side elevation and top views, respectively, of the precast version of the present invention. In FIGS. 12 and 13, it can be seen how a concrete block base 50 has been formed about the base 14. The concrete block base 50 is preferably formed in a square shape, and is preferably approximately the height of the base 14. FIG. 12 also illustrates a cast-in threaded insert 52.

Figure 14:
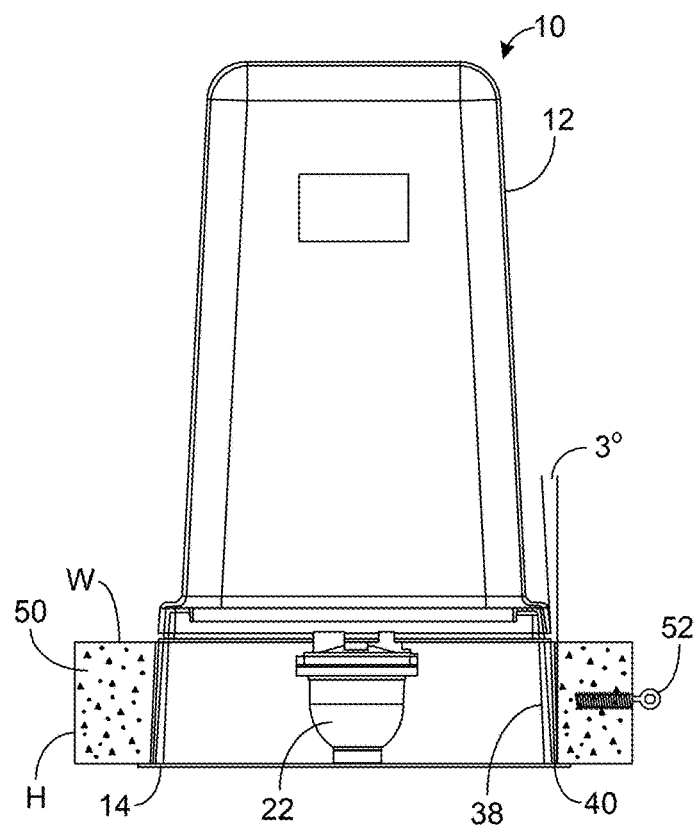
FIG. 14 is a sectional view of the precast version of the present invention.

FIG. 14 is a sectional view of the ARV capsule 10 with concrete block base 50. In FIG. 14, it can be seen how the concrete block base 50 abuts the vertical walls 38 of the base 14. Importantly, the outwardly extending piece 40 is positioned under the concrete block base 50 so as to hold the concrete block base 50 in place, and to secure the base 14 in-ground and around the air release valve 22.

In a preferred embodiment, the concrete block base comprises approximately 4.3 cubic feet of concrete. The width W may be approximately 6 inches, and the height H may be approximately 9 inches.

The ARV capsule 10 of the present invention provides a enclosure that is very secure and sturdy relative to the prior art enclosures. This ARV capsule is resistant to damage from landscaping equipment and vehicles. Use of the ARV capsule the present invention prevents overflow or leaks of sanitary sewer and other pipelines, thus saving time and money associated with the leaks, and preventing reporting to the EPA.

The UV-resistant gel coated exterior of the ARV capsule 10 resists corrosion, thus lengthening the life of the ARV capsule and preventing weakening thereof. The gel coated exterior of the capsule also resists defacement and vandalism.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for protecting an exposed air release valve or other public works component, the apparatus comprising:
   an enclosure having a side wall and an open end with a flange extending along a perimeter of the open end, the flange having a plurality of bolt holes formed therethrough; and
   a base having a side wall, an open top, an open bottom, and a horizontal bearing surface extending along a perimeter of the side wall of said base adjacent the open top, the horizontal bearing surface adapted to receive the flange of the enclosure, the base having a plurality of bolt holes formed thereon corresponding respectively to locations of the plurality of bolt holes of the enclosure, wherein each of the plurality of bolt holes of the enclosure and each of the plurality of bolt holes of the base have threaded inserts adapted to receive threaded bolts therein.

2. The apparatus of claim 1, wherein the side wall of said base comprises an outwardly-protruding perimeter adjacent the open bottom thereof.

3. The apparatus of claim 1, said enclosure comprising at least one integrally-formed vent.

4. The apparatus of claim 3, said at least one integrally-formed vent comprising a panel extending at an acute angle relative to the side wall of the enclosure.

5. The apparatus of claim 3, said at least one integrally-formed vent comprising a slot formed in the side wall of said enclosure.

6. The apparatus of claim 1, said side wall of said base comprising four side walls in a square configuration.

7. The apparatus of claim 6, said enclosure comprising:
   four side walls angled inwardly towards each other extending upwardly from said base; and
   a flat top.

8. The apparatus of claim 1, wherein the enclosure comprises a UV-resistant gel coat exterior.

9. The apparatus of claim 1, wherein the enclosure and base are constructed of fiber-reinforced plastic material.

10. The apparatus of claim 1, said flange comprising:
    a transition section extending in a generally horizontal direction from the side wall of the enclosure;
    a plurality of vertical walls extending downwardly from the transition section in a generally vertical direction.

11. The apparatus of claim 10, the horizontal bearing surface of the base positioned inwardly from the side wall of the base, so as to form a seat on the perimeter of the side wall of the base, said seat positionable against the vertical walls of the flange of the enclosure.

12. An apparatus for protecting an exposed air release valve or other public works component, the apparatus comprising:
    an enclosure having a four side walls, a square-shaped open end and a flat top opposite said square-shaped open end, said four side walls extending angularly inwardly towards each other and upwardly from said square-shaped open end, said enclosure having a flange extending along a perimeter of said square-shaped open end, the flange having a plurality of bolt holes formed therethrough, said enclosure having at least one integrally-formed vent; and
    a square-shaped base having a four side walls, an open top, an open bottom, and a horizontal bearing surface extending along a perimeter of the four side walls of the base adjacent said open top, the horizontal bearing surface adapted to receive the flange of the enclosure, the base having a plurality of bolt holes formed thereon corresponding to locations of the plurality of bolt holes of the enclosure, said flange having a transition section extending in a generally horizontal direction and a plurality of vertical walls extending downwardly form the transition section in a generally vertical direction, wherein each of the plurality of bolt holes of the enclosure and each of the plurality of bolt holes of the base have threaded inserts adapted to receive threaded bolts therein.

13. The apparatus of claim 12, said at least one integrally-formed vent comprising a panel extending at an acute angle relative to a side wall of the at least one of the four side walls of the enclosure.

14. The apparatus of claim 12, said at least one integrally-formed vent comprising a slot formed in at least one of the four side walls of the enclosure.

15. The apparatus of claim 12, wherein the enclosure comprises a UV-resistant gel coat exterior.

16. The apparatus of claim 12, wherein the enclosure and base are constructed of fiber-reinforced plastic material.

\* \* \* \* \*